United States Patent [19]
Mitchell et al.

[11] Patent Number: 5,703,858
[45] Date of Patent: Dec. 30, 1997

[54] SYSTEM FOR ENCODING A GLASS MASTER TO ENABLE DETECTION OF A COUNTERFEIT OPTICAL CD-ROM

[75] Inventors: Michael L. Mitchell; Barry Alan Fite, both of Terre Haute, Ind.; Akiya Saito, Odaware, Japan; Anthony C. New, Terre Haute, Ind.

[73] Assignees: Sony Corporation, Tokyo, Japan; Digital Audio Disc Corporation, Terre Haute, Ind.

[21] Appl. No.: 735,377

[22] Filed: Oct. 21, 1996

Related U.S. Application Data

[63] Continuation of Ser. No. 376,277, Jan. 23, 1995, abandoned.
[51] Int. Cl.$^6$ .......................................................... G11B 7/00
[52] U.S. Cl. ............................... 369/58; 369/53; 369/47; 369/275.5
[58] Field of Search .................................. 369/53, 54, 58, 369/59, 47, 48, 275.5, 52, 283, 275.3, 275.4, 292

[56] References Cited

U.S. PATENT DOCUMENTS

| | | | |
|---|---|---|---|
| 5,226,027 | 7/1993 | Bakx | 369/48 X |
| 5,400,319 | 3/1995 | Fite et al. | 369/275.5 |

OTHER PUBLICATIONS

"Disc Label Designer Graphic Editor & Disc Label Generator" Series 500 Mastering Modules, Optical Disc Corporation, Santa Fe Springs California.

"SID Code Finalised—Now Its Official,"ONE to ONE, p. 26, Mar./Apr., 1994.
"SID Code: Majors Move Ahead," ONE to ONE, International News, p. 5, Feb., 1994.
"GATT—Trips . . . And Falls Over," ONE to ONE, International News, p. 16, Feb., 1994.

*Primary Examiner*—Muhammad N. Edun
*Attorney, Agent, or Firm*—Pasquale Musacchio; Jerry A. Miller

[57] ABSTRACT

A device for enabling detection of a counterfeit optical CD-ROM is disclosed for use in a conventional mastering system. The device includes a signal source for providing a first signal for forming a predetermined defect in a glass master. The device also includes a switch for connecting a recorder of the mastering system to the signal source. In addition, the device includes a decoder for decoding encoded data and address information provided from an input source of the mastering system. Furthermore, the device includes a central processor unit which serves to detect whether a selected address from the decoded data is present. Upon detection of the selected address, the CPU controls the switch to connect the signal source to the recorder to enable the recorder to receive the first signal and form the predetermined defect at the selected address. When a CD-ROM manufactured from the glass master is played back, a desired error signal is generated at the predetermined address indicating that the CD-ROM is not counterfeit. Further, when a counterfeit CD-ROM is played back, the desired error signal is not generated at the predetermined address, thus enabling detection of the counterfeit CD-ROM. In addition, the defect is not visible to the unaided eye when the CD-ROM is viewed.

19 Claims, 3 Drawing Sheets

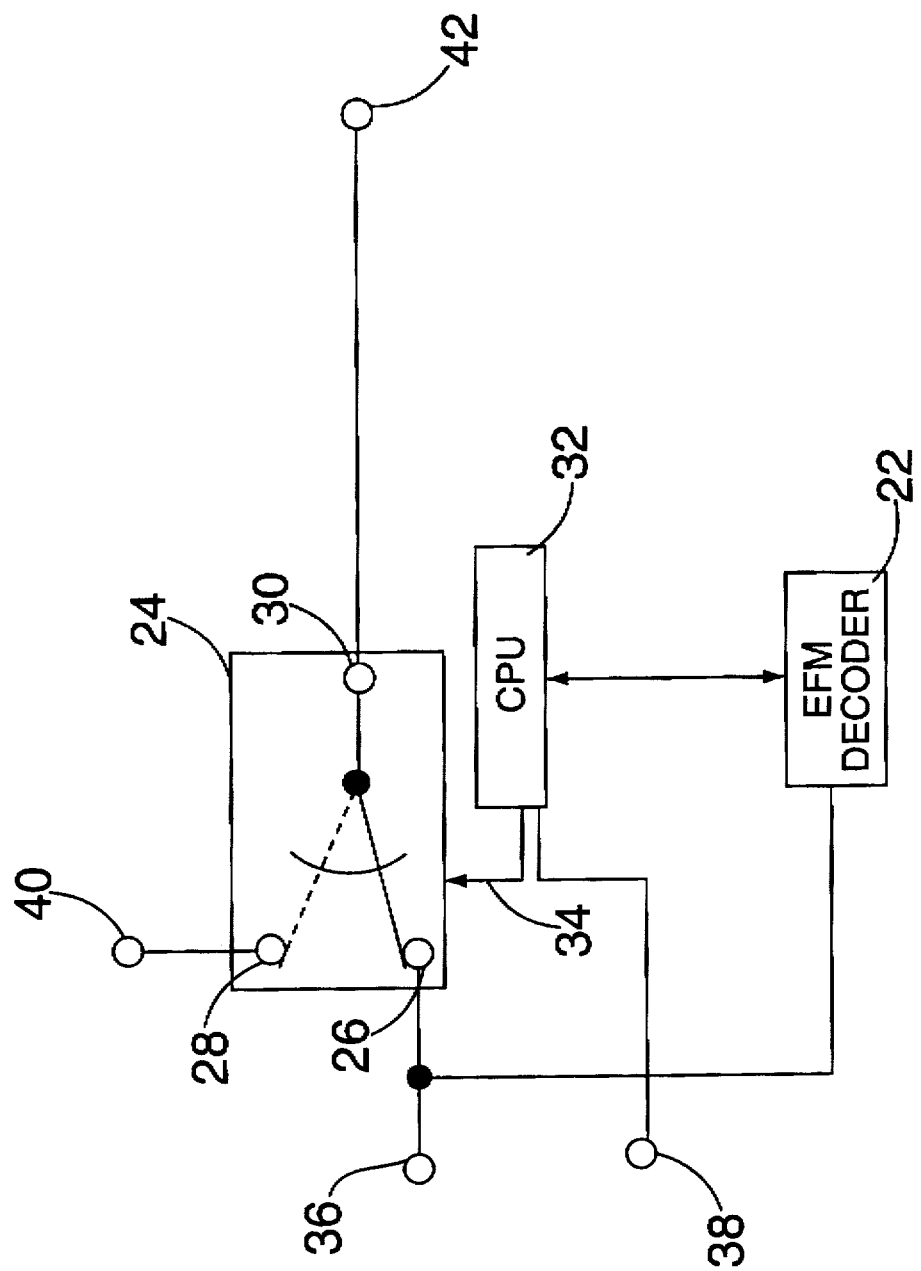

SYSTEM FOR ENCODING A GLASS MASTER TO ENABLE DETECTION OF A COUNTERFEIT OPTICAL CD-ROM

This is a continuation of application Ser. No. 08/376,277 filed on Jan. 23, 1995, now abandoned, which is hereby incorporated by reference.

The disclosure of copending patent application Ser. No. 08/132,709 is hereby incorporated by reference.

FIELD OF THE INVENTION

This invention relates to the detection of counterfeit optical CD-ROMs, and more particularly, to a device for forming a predetermined defect at a predetermined location on an optical CD-ROM glass master used to manufacture a metal master from which duplicate CD-ROMs are fabricated, wherein when a duplicate CD-ROM is played back, a desired error signal is generated at a predetermined address and when a counterfeit CD-ROM is played back, the desired error signal is not generated at the predetermined address, thus enabling detection of the counterfeit CD-ROM.

BACKGROUND OF THE INVENTION

In conventional CD-ROM mastering, an input source is utilized to provide data which has been encoded in a manner well known in the art. The encoded data is transmitted to a laser beam recorder (LBR) which utilizes the encoded data to selectively subject areas of a glass disk to a laser beam. The glass disk is then chemically treated in order to ultimately form an original glass master used to manufacture a metal master from which duplicate CD-ROMs are fabricated. In addition, with the advent of direct from disk mastering technology, a duplicate CD-ROM may also be utilized to manufacture a glass master. However, this technology also enables a counterfeiter to use a duplicate CD-ROM to form a counterfeit glass master in order to manufacture counterfeit CD-ROMs. Such illegal copying, or piracy, has caused great concern in the industry, resulting in the formation of organizations whose purpose is the elimination of piracy. Further, it has been estimated that such illegal copying costs legal manufacturers of CD-ROMs over $260 million per year. In this regard, reference is made to an article in the February 1994 edition of "One to One", page 16, entitled "GATT-TRIPS . . . And Falls Over".

Various methods have been used to identify a CD-ROM in order to attempt to distinguish between a legally manufactured and counterfeit CD-ROM. One method includes forming a serial number on the CD-ROM by a process entitled "Maple Leaf" proposed by JVC. Another method includes using a code known as a Source Identification Code (SID Code) which identifies the manufacturing facility where a CD was replicated and where a master was originally manufactured. In this regard, reference is made to articles in the February 1994 and March/April 1994 editions of "One to One" entitled "SID code: Majors move ahead", page 5, and "SID Code finalised—now it's official", page 26, respectively.

In addition, bar codes have been used to identify CD-ROMs. In this regard, reference is made to a publication by Optical Disc Corporation entitled "Disc Label Designer™ Graphic Editor & Disc Label Generator" which describes the insertion of text and bar code information near the inside of the disk. Further, although not described, the equipment utilized in this method could also be used to generate text or characters in the program area of the disk in order to distinguish counterfeit disks from legally manufactured disks. In addition, Sony Corporation manufactures a Bar Code/Text Generator which also forms bar code and text information near the inside of the disk.

Furthermore, dyes have been used for identifying a CD-ROM. In this method, a selected dye is added to a protective layer of the CD-ROM. The dye, when exposed to selected light sources, emits light having a color which identifies a selected manufacturing facility. This enables the use of selected colors to identify each manufacturing facility.

However, a disadvantage with each of these methods is that such identifying information may be readily and accurately copied by counterfeiters utilizing available technology. As a result, illegally copied CD-ROMs are manufactured by counterfeiters which are essentially indistinguishable from legal CD-ROMs and thus undetectable.

In this regard, hologram technology known as Nimbus, Replicate Stage or D.B.C./Holographic Label has been utilized for identifying the manufacturer of a CD-ROM. Essentially, this method includes the formation of a holographic image on the CD-ROM which is visible to the naked eye. The image formed is difficult to copy, thus enabling an illegally copied CD-ROM to be readily identifiable. Another method includes the use of "waterspot" technology introduced by Sonopress. In this method, a pattern is formed on the disk which is visible to the naked eye and difficult to copy. The pattern may be text or graphics and may be placed anywhere in the information area of the disk. However, a disadvantage with these methods is that the contents of the CD-ROM may still be accurately duplicated, thus not affecting playback of the illegal CD-ROM on conventional equipment. As a result, a counterfeiter is not substantially discouraged from illegally copying the disk. Further, it has been found that this technology is expensive to implement in CD-ROMs.

As such, efforts have been made to inhibit copying of CD-ROMs. In this regard, copending patent application Serial No. 08/132,709, assigned to Digital Audio Disc Corporation, the assignee herein, describes a method wherein multiple information areas of a disk are destroyed in order to form a code which is detectable by software. Further, the information areas are destroyed after the disk has been manufactured. However, the destroyed information areas are sufficiently large such that they are visible to the unaided eye, thus enabling detection by a potential counterfeiter.

Therefore, it is an object of the present invention to provide a system which does not enable accurate duplication of a CD-ROM by forming a predetermined defect, which cannot be accurately duplicated, at a predetermined location on an optical CD-ROM glass master wherein the defect is not visible to the unaided eye in a duplicate CD-ROM manufactured from the glass master, and when the duplicate CD-ROM is played back, a desired error signal is generated at a predetermined address indicating the CD-ROM is not counterfeit and when a counterfeit CD-ROM is played back, the desired error signal is not generated at the predetermined address, thus enabling detection of the counterfeit CD-ROM so as to render the CD-ROM unusable thus substantially discouraging a potential counterfeiter.

SUMMARY OF THE INVENTION

A device for encrypting a glass master to inhibit manufacture of a counterfeit optical CD-ROM. The device is used in conjunction with a mastering system having an input source for providing EFM encoded data which includes sector address information and a recorder for forming a glass master in accordance with a received signal. In particular, the device includes a signal source for providing a first signal for forming a predetermined defect in the glass master and a switch for connecting the recorder to either the input source or the signal source. The device further includes a decoder for decoding the EFM encoded data and the sector address information in order to provide decoded data. In addition, a central processor unit (CPU) is coupled to the decoder which serves to detect a sector address selected from the decoded data. Upon detection of the sector address by the CPU, the CPU controls the switch so as to connect the signal source to the recorder to thus enable the recorder to receive the first signal and form the predetermined defect at the selected sector address. This causes a predetermined error signal to be generated at the sector address when a CD-ROM manufactured from the glass master is played back indicating that the CD-ROM is not counterfeit and when a counterfeit CD-ROM is played back, the predetermined error signal is not generated at the sector address, thus indicating that the CD-ROM is counterfeit. Further, the defect on the CD-ROM is not visible to the unaided eye.

BRIEF DESCRIPTION OF THE FIGURES

FIG. 2 shows a schematic for a switching device in accordance with the present invention.

DETAILED DESCRIPTION OF THE INVENTION

Figure 1:
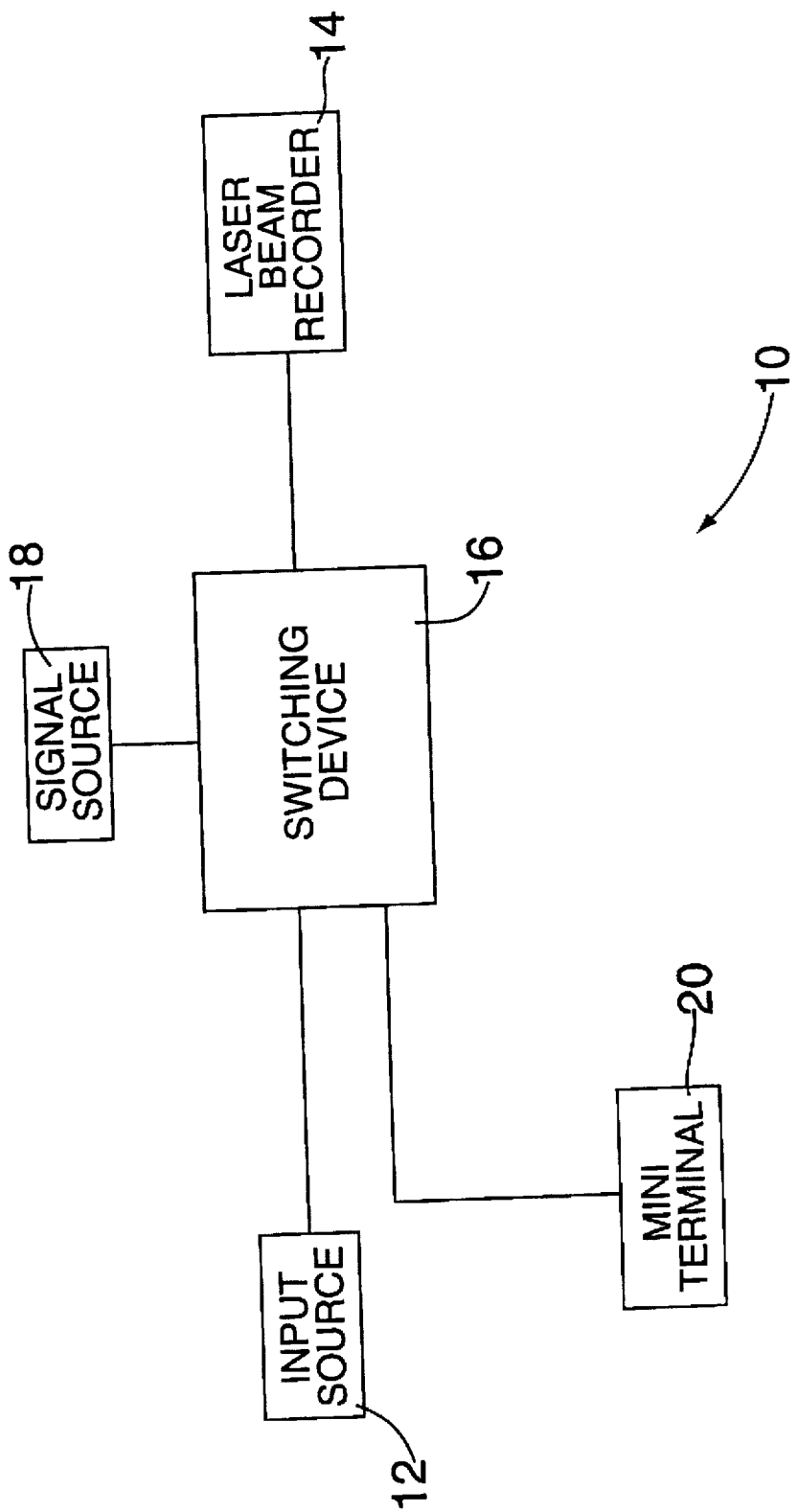
FIG. 1 is a block diagram for a system for encoding a glass master.

The present invention will now be described by referring to FIGS. 1–3B, wherein like elements are designated by like reference numerals. Referring to FIG. 1, a block diagram for a system 10 for encoding a glass master to enable the detection of a counterfeit optical CD-ROM is shown. In conventional CD-ROM mastering, an input source 12 is utilized to provide data which has been encoded using eight to fourteen modulation (EFM) in a manner well known in the art. The EFM encoded data is then transmitted to a laser beam recorder (LBR) 14 which utilizes the EFM encoded data to selectively subject areas of a glass disk to a laser beam. The glass disk is then chemically treated in order to ultimately form an original glass master used to fabricate a metal master from which CD-ROMs are replicated. In accordance with the present invention, the system 10 is located between the input source 12 and the LBR 14. The system 10 includes a switching device 16 which enables the ultimate formation of a desired defect on the glass master at a predetermined location. A CD-ROM may include 333,000 blocks, or sectors, each having 2048 bytes of user data. In a preferred embodiment, at least one sector is destroyed in order to form the defect. Further, the configuration and size of the defect is preferably such that the defect is not visible to the unaided eye when a CD-ROM having the defect is viewed. The system 10 further includes a signal source 18 for providing random high frequency (HF) or other signal suitable for producing data errors in the desired sector or sectors. In addition, the system 10 includes a computer terminal 20 which enables a user to define the location or sector address of the sector to be destroyed.

Referring to FIG. 2, a schematic for the switching device 16 is shown. The switching device 16 includes an EFM decoder 22, an analog switch 24 having first 26, second 28 and third 30 switch terminals and a CPU 32 for controlling the analog switch 24 having control line 34. The switching device 16 further includes data 36, sector address 38 and signal 40 input terminals and an output terminal 42. The data input terminal 36 is connected to the first switch terminal 26 and to the EFM decoder 22. The CPU 32 is connected to the sector address input terminal 38 and coupled to the EFM decoder 22. The signal input terminal 40 is connected to the second switch terminal 28. The data 36, sector address 38 and signal 40 input terminals are connected to the input source 12, the computer terminal 20 and the signal source 18, respectively (FIG. 1). Further, the output terminal 42 is connected between the third switch terminal 30 and the LBR 14. The analog switch 24 serves to electrically connect the first 26 and third 30 switch terminals when the analog switch 24 is turned on through control line 34 or to electrically connect the second 28 and third 30 switch terminals when the analog switch 24 is turned off through control line 34.

In normal operation, the analog switch 24 is on, thus enabling EFM encoded data having encoded address information provided by the input source 12 to be transmitted as a data stream to the output terminal 42 and ultimately to the LBR 14. The LBR 14 is then driven to selectively subject areas of the glass disk to a laser beam in accordance with the EFM encoded data. Further, EFM encoded data from the input source 12 is also transmitted to the EFM decoder 22 where the address information is decoded and then provided to the CPU 32. In accordance with the present invention, the user employs the computer terminal 20 to input to the CPU 32 a sector address for a desired sector to be destroyed. The CPU 32 then monitors the decoded address information and detects whether the sector address is present. Upon detection of the sector address, the CPU 32 controls the analog switch 24 through control line 34 so as to turn off analog switch 24. This interrupts the data stream supplied by the input source 12 and connects the signal source 18, thus enabling the transmittance of a random HF or other signal to the LBR 14. The LBR 14 is then driven to subject areas of the glass disk to the laser beam in accordance with the random HF signal. When this is complete, the CPU 32 controls the analog switch through control line 34 so as to turn on analog switch 24. This resumes transmittance of EFM encoded data to again selectively subject areas of the glass disk to a laser beam in accordance with the EFM encoded data. Upon completion, the glass disk is then chemically treated in a well known manner in order to ultimately form an encrypted glass master having a defect at a predetermined address. The encrypted glass master is then used to form a metal master from which encrypted CD-ROMs, each having the defect at the predetermined address, may be manufactured.

CD-ROM verification equipment having a CD-ROM drive is frequently utilized during the manufacturing process to check data. It has been found that when an encrypted CD-ROM having the defect is played back on a CD-ROM drive, the defect causes the generation of an error message, known as a device medium error, at a predetermined address thus indicating that sector data is missing or difficult to obtain. When an encrypted CD-ROM having the defect is utilized to form a second, or counterfeit, glass master, the duplicating equipment attempts to reconstruct the missing data in order to keep the integrity of the sector intact. However, since random HF was used to form the defect, the reconstructed data will not be an accurate duplication. It has been found that upon playback of a second, or counterfeit, CD-ROM fabricated from the counterfeit glass master, a different error message indicating that data is incorrect or missing is generated.

This is shown by a test in which an encrypted CD-ROM having a defect at a predetermined address (designated as Test -A) and a counterfeit CD-ROM (designated as Test-B) are each played back on CD-ROM verification equipment. In order to form the encrypted CD-ROM, an encrypted glass master was formed by interrupting an EFM signal used for forming the glass master at approximately 40:00:00 minutes, absolute time, in order to enable insertion of random HF to form the defect. The encrypted glass master was then utilized to ultimately manufacture the encrypted CD-ROM. Subsequently, the encrypted CD-ROM was utilized to form a counterfeit glass master from which the counterfeit CD-ROM was ultimately formed.

The encrypted and counterfeit CD-ROMs were then tested for high frequency (HF), block error rate (BER) and track pitch parameters by using test equipment used to certify stampers as acceptable for production use. Further, the test equipment serves to detect and correct data errors by using a scheme known as the Cross-Interleave Reed-Solomon Code (CIRC). The test results are as shown in Table 1:

TABLE 1

| TEST DATA | Test-A (encrypted CD-ROM) | Test-B (counterfeit CD-ROM) |
| --- | --- | --- |
| HF Results | Good | Good |
| BER Results | C2 error & Drop Out @ 40:00 min | Good |
| Track Pitch | Good | Good |

Referring to Table 1, the BER Results show that the encrypted CD-ROM had a "C2" error at 40:00 minutes. This indicates an unrecoverable error which could not be corrected by the CIRC. However, no errors were detected when the second master was tested, thus indicating that data was reconstructed when the second master was manufactured.

Subsequently, the encrypted and counterfeit CD-ROMs were each played back on four different CD-ROM drives used in conjunction with the verification equipment. In particular, the drives utilized were a Philips LMS CM212 drive, a Toshiba XM-3401TA 2 speed drive, a Sony CDU-541 drive and a Sony CDU-561 2 speed drive, although it is noted that other drives may be used. The results for the verification test are as shown in Table 2:

TABLE 2

| CD-ROM Verification | Test-A (encrypted CD-ROM) | Test-B (counterfeit CD-ROM) |
| --- | --- | --- |
| Phillips LMS CM 212 | communication failure @ block 179851 | Mismatch found @ block 179850 |
| Toshiba XM-3401TA (2X) | SCSI device medium error @ block 179851 | SCSI blank block encountered @ 179850 |
| Sony CDU-541 | SCSI device medium error @ block 179851 | Mismatch found @ block 179850 |
| Sony CDU-561 (2X) | SCSI device medium error @ block 179851 | Mismatch found @ block 179850 |

Referring to Table 2, the error messages generated for the Toshiba and both Sony drives are the same for the encrypted CD-ROM. In particular, the error message generated, i.e. "SCSI device medium error @ block 179851", indicates that the drive had difficulty reading data from the encrypted master at block 179851. In regard to the Philips drive, although the error message indicated at block 179851 is different, the message generated indicates a similar type of error. Further, an error message identical to that indicated for the Toshiba and both Sony drives, i.e. "SCSI device medium error" was generated at a later block, i.e. block 179853.

In regard to the counterfeit CD-ROM, the error messages generated, i.e. "Mismatch found @ block 179850" for the Philips and both Sony drives and "SCSI blank block encountered @ 179850" for the Toshiba drive, indicate an error that may be categorized as data being incorrect or missing.

Therefore, playback of an encrypted CD-ROM formed from the encrypted glass master will cause the generation of a device medium or similar type of error. However, upon playback of a counterfeit CD-ROM formed from the counterfeit glass master, the reconstructed data causes the generation of a different error message indicating a different type of error. In accordance with the present invention, error detecting software is stored on the CD-ROM or the drive which is adapted to detect whether or not the device medium or similar type of error occurs at the predetermined address. Therefore, detection of the device medium error at the predetermined address indicates that the encrypted CD-ROM is not counterfeit.

However, upon playback of a counterfeit CD-ROM, the error detecting software will not detect a device medium or similar type error at the predetermined address to thus indicate that the CD-ROM is counterfeit. Once a counterfeit CD-ROM is indicated, the error detecting software may be adapted to deny further access to the CD-ROM or other suitable options which render the counterfeit CD-ROM unusable. In this manner, a potential counterfeiter would be discouraged from illegally copying an encrypted CD-ROM. Further, the defect does not create any visible cosmetic flaws on the encrypted CD-ROM and does not substantially affect tracking and servo focus systems of the CD-ROM drive utilized.

Figure 3A:
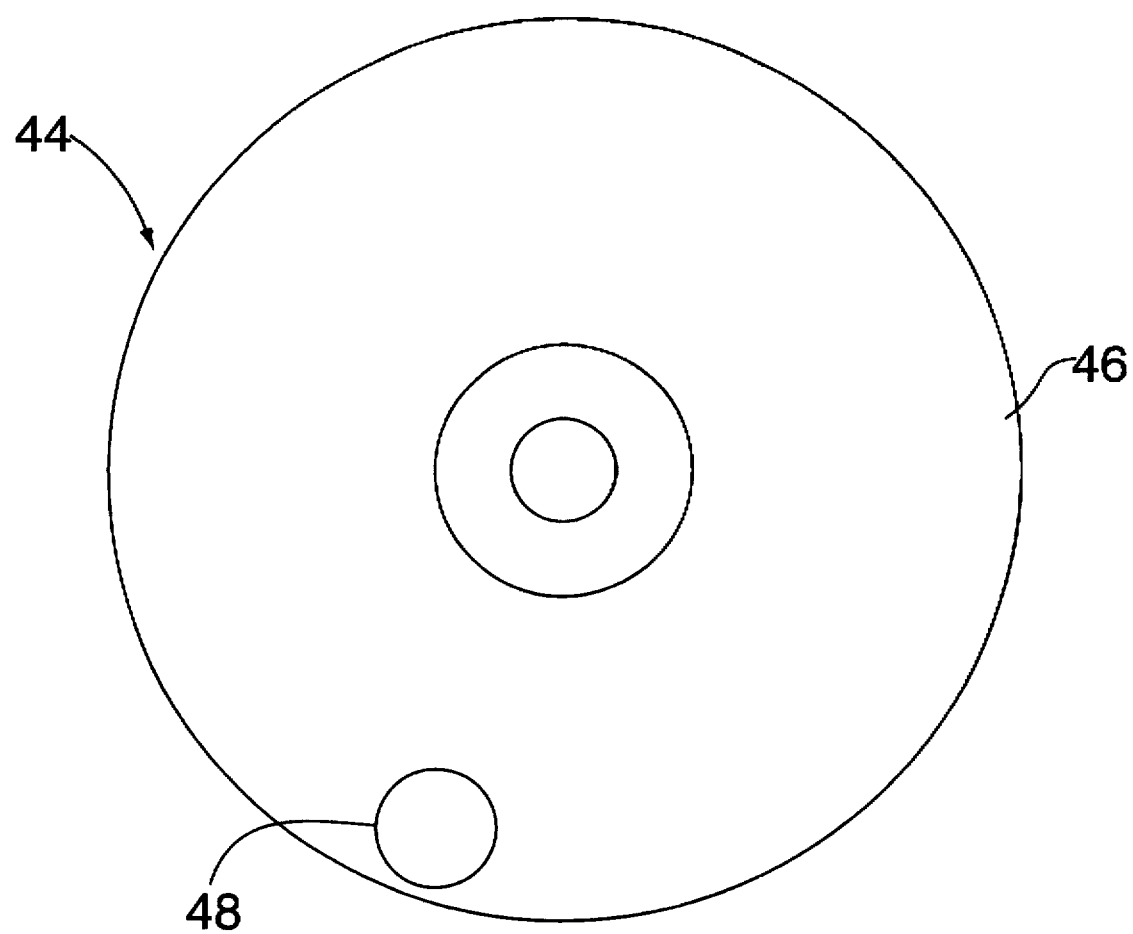
FIGS. 3A and 3B illustrate a CD-ROM having a predetermined defect.
Figure 3B:
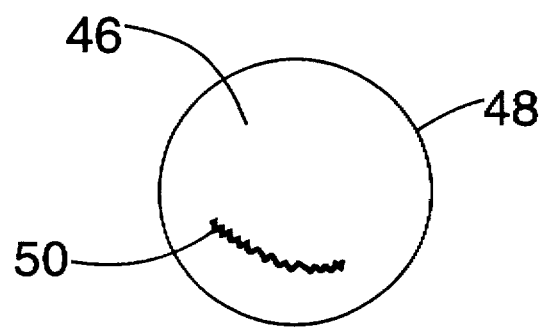

Referring to FIG. 3A, an encrypted CD-ROM 44 in accordance with the present invention is shown. The CD-ROM 44 includes a signal surface 46 for storing digitally encoded data represented by pits and lands formed on the signal surface 46 which may be read by an optical device. A CD-ROM may include 333,000 blocks, or sectors, each having 2048 bytes of user data. In a preferred embodiment, at least one sector is destroyed in order to form the defect. Further, the configuration and size of the defect is preferably such that the defect is not visible to the unaided eye when the CD-ROM 44 is viewed. By way of example, the defect may be formed within balloon section 48 of FIG. 3A and is not visible to the unaided eye. Referring to FIG. 3B, an enlarged view of balloon section 48 of FIG. 3A is shown. In this view, a defect 50 is shown on a portion of the signal surface 46 corresponding to at least one sector destroyed by a suitable signal such as a random high frequency signal. When this occurs, the signal surface 46 is formed such that an error signal is produced when the CD-ROM 44 is played back. The error signal serves to indicate that the CD-ROM 44 is not counterfeit, wherein a counterfeit CD-ROM is indicated if the error signal is not generated.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A device for forming a glass master to inhibit manufacture of a counterfeit optical CD-ROM, wherein said device is used in conjunction with a mastering system having an input source for providing data to be recorded on said glass master and a recorder for forming said glass master in accordance with a received signal, comprising:

a signal source for providing a random high frequency signal for forming a first defect in said glass master;

a switch for electrically connecting said recorder to said signal source; and a central processor unit (CPU) for controlling said switch to electrically connect said signal source to said recorder to form said first defect at a selected address of said glass master wherein said first defect causes generation of a predetermined error signal in a CD-ROM manufactured from said glass master.

2. The device according to claim 1 further including terminal means for selecting said selected address.

3. The device according to claim 1 wherein said encoded data is EFM encoded data.

4. The device according to claim 1, wherein said selected address is a sector address.

5. A device for forming a glass master to inhibit manufacture of a counterfeit optical CD-ROM, wherein said device is used in conjunction with a mastering system having an input source for providing EFM encoded data which includes sector address information and a recorder for forming said glass master in accordance with a received signal, comprising:

a signal source for providing a random high frequency signal for forming a first defect in said glass master;

a switch for connecting said recorder to either said input source or said signal source;

a decoder for decoding said EFM encoded data and said sector address information to provide decoded data;

a central processor unit (CPU) coupled to said decoder for detecting whether or not a selected address from said decoded data is present, wherein when said selected sector address is detected, said CPU controls said switch to connect said signal source to said recorder to enable said random high frequency signal to form said first defect at said selected address wherein said first defect is not visible to an unaided eye in a CD-ROM manufactured from said glass master, and when said CD-ROM is played back a predetermined error signal is generated indicating said CD-ROM is not counterfeit and when duplicating equipment is used to duplicate said CD-ROM to form a counterfeit glass master, said first defect is not accurately duplicated wherein when a counterfeit CD-ROM formed from said counterfeit glass master is played back, said predetermined error signal is not generated thus indicating a counterfeit CD-ROM; and selecting means for selecting said sector address from said encoded data.

6. The device according to claim 5 wherein said selecting means is a computer terminal.

7. The device according to claim 5 wherein said encoded data is EFM encoded data.

8. The device according to claim 5, wherein said selected address is a sector address.

9. A mastering system for forming a glass master having a defect at a predetermined address to inhibit manufacture of a counterfeit CD-ROM, comprising:

an input source for providing an input signal having encoded data which includes address information;

a signal source for providing a random high frequency signal for forming a first defect;

a recorder for forming said glass master in accordance with a received signal;

a switch for connecting said recorder to either said input source or said signal source;

a decoder for decoding said encoded data and said address information to provide decoded data; and a central processor unit (CPU) coupled to said decoder for detecting whether or not a selected address from said decoded data is present, wherein when said selected address is not detected, said CPU controls said switch to connect said recorder to said input source to enable formation of said glass master, and wherein when said selected address is detected, said CPU controls said switch to connect said signal source to said recorder to enable said random high frequency signal to form said first defect at said selected address wherein said first defect is not visible to an unaided eye in a CD-ROM manufactured from said glass master, and when said CD-ROM is played back a predetermined error signal is generated indicating said CD-ROM is not counterfeit and when duplicating is used to duplicate said CD-ROM to form a counterfeit glass master, said first defect is not accurately duplicated wherein when a counterfeit CD-ROM formed from said counterfeit glass master is played back, said predetermined error signal is not generated thus indicating a counterfeit CD-ROM.

10. The device according to claim 9 further including terminal means for selecting said selected address.

11. The device according to claim 9 wherein said encoded data is EFM encoded data.

12. The device according to claim 9, wherein said selected address is a sector address.

13. A method for forming a glass master having a defect, comprising the steps of:

(a) providing an input signal to a recorder for forming said glass master;

(b) generating a a random high frequency signal for forming a first defect;

(c) selecting a predetermined address at which to form said first defect;

(d) providing said signal to said recorder to form said first defect at said predetermined address wherein said first defect causes generation of a predetermined error signal in a CD-ROM manufactured from said glass master for inhibiting manufacture of counterfeit CD-ROMs.

14. The method according to claim 13, wherein said input signal includes encoded address information and further including the step of decoding said encoded address information.

15. The method according to claim 13 further including terminal means for selecting said selected address.

16. The device according to claim 13 wherein said input signal includes EFM encoded data.

17. A CD-ROM adapted for inhibiting unauthorized copying of said CD-ROM, comprising:

a disk shaped element having a signal surface for storing digitally encoded data, said data being represented by pits and lands formed on said signal surface, wherein a portion of said signal surface is formed for providing data for producing an error signal when said CD-ROM is played back, said portion being formed by a random high frequency signal and not being visible to an unaided eye and said error signal indicating that said CD-ROM is not counterfeit, wherein if said error signal is not generated a counterfeit CD-ROM is indicated.

18. The CD-ROM according to claim 17, wherein said data includes sectors and said portion includes at least one sector.

19. The CD-ROM according to claim 17, wherein the location of said portion is predetermined.

* * * * *